United States Patent [19]
Riccardi

[11] Patent Number: 5,832,719
[45] Date of Patent: Nov. 10, 1998

[54] ROCKET THRUST CHAMBER

[75] Inventor: Donald P. Riccardi, Tequesta, Fla.

[73] Assignee: United Technologies Corporation, Hartford, Conn.

[21] Appl. No.: 573,925

[22] Filed: Dec. 18, 1995

[51] Int. Cl.$^6$ .................................................. F02K 9/64
[52] U.S. Cl. ............................ 60/267; 60/266; 60/39.32
[58] Field of Search .................................. 60/39.32, 260, 60/266, 267

[56]  References Cited

U.S. PATENT DOCUMENTS

| | | | |
|---|---|---|---|
| 2,844,939 | 7/1958 | Schultz | 60/267 |
| 2,958,183 | 11/1960 | Singlemann | 60/260 |
| 3,049,870 | 8/1962 | Chamberlain | 60/260 |
| 3,066,702 | 12/1962 | Tumavicus | 60/267 |
| 3,190,070 | 6/1965 | Neu, Jr. | 60/267 |
| 3,208,132 | 9/1965 | Escher | 60/267 |
| 3,595,025 | 7/1971 | Stockel et al. | 60/267 |
| 3,692,637 | 9/1972 | Dederra et al. | 60/267 |
| 3,798,902 | 3/1974 | Butter | 60/267 |
| 3,835,644 | 9/1974 | Butter et al. | 60/267 |
| 5,233,755 | 8/1993 | Vandendriessche | 29/890.1 |

FOREIGN PATENT DOCUMENTS 2827228  1/1980  Germany ................................ 60/267

*Primary Examiner*—Timothy Thorpe
*Assistant Examiner*—Ted Kim
*Attorney, Agent, or Firm*—Christopher T. Hayes

[57]  ABSTRACT

A thrust chamber for an expander cycle rocket engine having a predetermined quantity of tubes concentric about an axis and radially inward of a structural jacket, each tube having first and second substantially planar sidewalls which diverge at an angle such that immediately adjacent tubes are in spaced relation to each other at the radially inward portion of each tube.

10 Claims, 3 Drawing Sheets

ROCKET THRUST CHAMBER

FIELD OF THE INVENTION

This invention is related to expander cycle rocket engines, and particularly to tubular thrust chambers for such engines.

BACKGROUND OF THE INVENTION

Rocket engines, such as those used on space missions, are costly to design and manufacture. In addition, there is a continuing and growing need for rockets capable of multiple firings in order to carry payloads into space or near-Earth orbits. Manufacturers of such rocket engines are constantly seeking new ways to increase the durability of the components which comprise such engines.

One such component is the rocket thrust chamber within which the propellants of the rocket engine are combusted and accelerated. Because of the extremely high temperatures of the propellants moving through the thrust chamber, the walls of the thrust chamber must be cooled in those applications which require multiple, sustained engine firings. In expander cycle rocket engines, such cooling is typically accomplished by flowing a coolant, such as liquid hydrogen, through tubes or channels which form the inner surface of the thrust chamber. The liquid hydrogen vaporizes due to the heat transfer, is expanded through a turbopump, and is then fed into the combustion chamber of the engine.

A typical expander cycle rocket engine cools the chamber/nozzle components with all the engine fuel flow, and the energy picked by the cooling process provides the power to drive the turbopumps. The relatively benign turbine environment created by this cycle results in weight, cost, and reliability advantages over other cycles (i.e., gas generator, staged combustion). The elimination of the preburner and corresponding ducting further enhances these advantages. Expander cycle engines have lower turbopump pressure requirements than staged combustion engines and higher performance potential than gas generator cycles. However, one major technology concern in reaching the true potential of the expander cycle engine (i.e., highest thrust in the smallest dimensional envelope) must be addressed: To provide the best possible performance while maintaining the reliability and low cost of the expander design, combustion chamber heat pickup must be maximized for maximum power to the drive turbines.

The simplicity of the expander cycle engine offers the ability to lower the cost of placing payloads to orbit. Improving performance of the system through increases in chamber pressure while maintaining the same dimensional envelope is highly desired. Current-generation engines are limited in their ability to increase chamber pressure, due to the low heat transfer afforded by the materials and design of the combustion chamber. Development of combustion chamber that increases chamber pressure and provides more performance while maintaining reliability and operability is key to advancing the ability of the expander engine.

Current rocket thrust chambers for expander cycle engines are constructed of stainless steel materials. These materials are only suitable for low chamber pressure applications (approximately 700 psia) because of heat transfer limitations. Copper alloys can allow significant increases in chamber pressures due to their significantly higher thermal conductivity. By taking advantage of copper's significantly higher thermal conductivity, the available heat to power the turbopumps of an expander cycle engine can be increased enough to enable chamber pressure levels as high as 1500 psia. Current thrust chambers that use copper as the hot side material, as in the main engine used on the Space Shuttle, experience durability problems such as liner burn-through, copper blanching, and hot streaks.

As those skilled in the art will readily appreciate, the thrust chambers rocket engines which undergo multiple firings during a mission are subject to failure due to thermally induced fatigue. In the thrust chamber, this may occur at sites where bonding was inadequate, or in locations where thermal expansion and contraction causes cyclic distortion that fatigues a component. One example of a thrust chambers is shown in U.S. Pat. No. 3,208,132 to Escher, which discloses a rocket chamber produced by forming coolant flow passages within two sheets by an explosive forming process. The formed sheets must be subsequently welded or brazed together to form individual flow passages, and the integrity of these welds is difficult to inspect.

U.S. Pat. No. 3,595,025 to Stockel et al discloses another type of thrust chamber liner having grooves which, when mated with a structural jacket, form cooling channels. Coolant flowing in these channels impedes heat transfer from the combustion products to the structural jacket, resulting in minimal thermal expansion of the jacket during engine firings. By contrast, substantial thermal expansion occurs at the liner surface exposed to the combustion products. This thermal expansion, coupled with minimal expansion of the jacket, causes the radially inner surface of the liner to bow, and the surface remains bowed until the engine quits firing. When the engine shuts down, the liner cools, unbowing the surface of the liner. The cyclic bowing and unbowing of the liner surface which results from multiple firings of such an engine may fatigue the liner to the point of failure.

What is needed is a rocket thrust chamber which is readily inspectable, provides heat transfer at rates that can provide enough energy to enable chamber pressure levels as high as 1500 psia, and can withstand the stress induced by thermal expansion and contraction produced by multiple engine firings.

SUMMARY OF THE INVENTION

It is therefore an object of the present invention to provide a rocket thrust chamber which provides for secure, readily inspectable tubes and the bonds between adjacent coolant tubes, and can withstand the stress induced by thermal expansion and contraction produced by multiple engine firings better than thrust chambers of the prior art.

According to the present invention, a thrust chamber for an expander cycle rocket engine is disclosed comprising a structural jacket having an axial centerline defined therethrough, a predetermined quantity, N, of tubes concentric about said axis and radially inward of said jacket relative to said axis, said tubes defining a tube bundle in which each tube spans a sector angle $\alpha$ equal to $360°/N$, and comprises first and second substantially planar sidewalls, said first sidewall diverging radially from said second sidewall thereby defining an angle of divergence $\beta$ between said first sidewall and said second sidewall, wherein the angle of divergence for each tube is greater than the sector angle.

The foregoing and other features and advantages of the present invention will become more apparent from the following description and accompanying drawings.

BEST MODE FOR CARRYING OUT THE INVENTION

Figure 1:
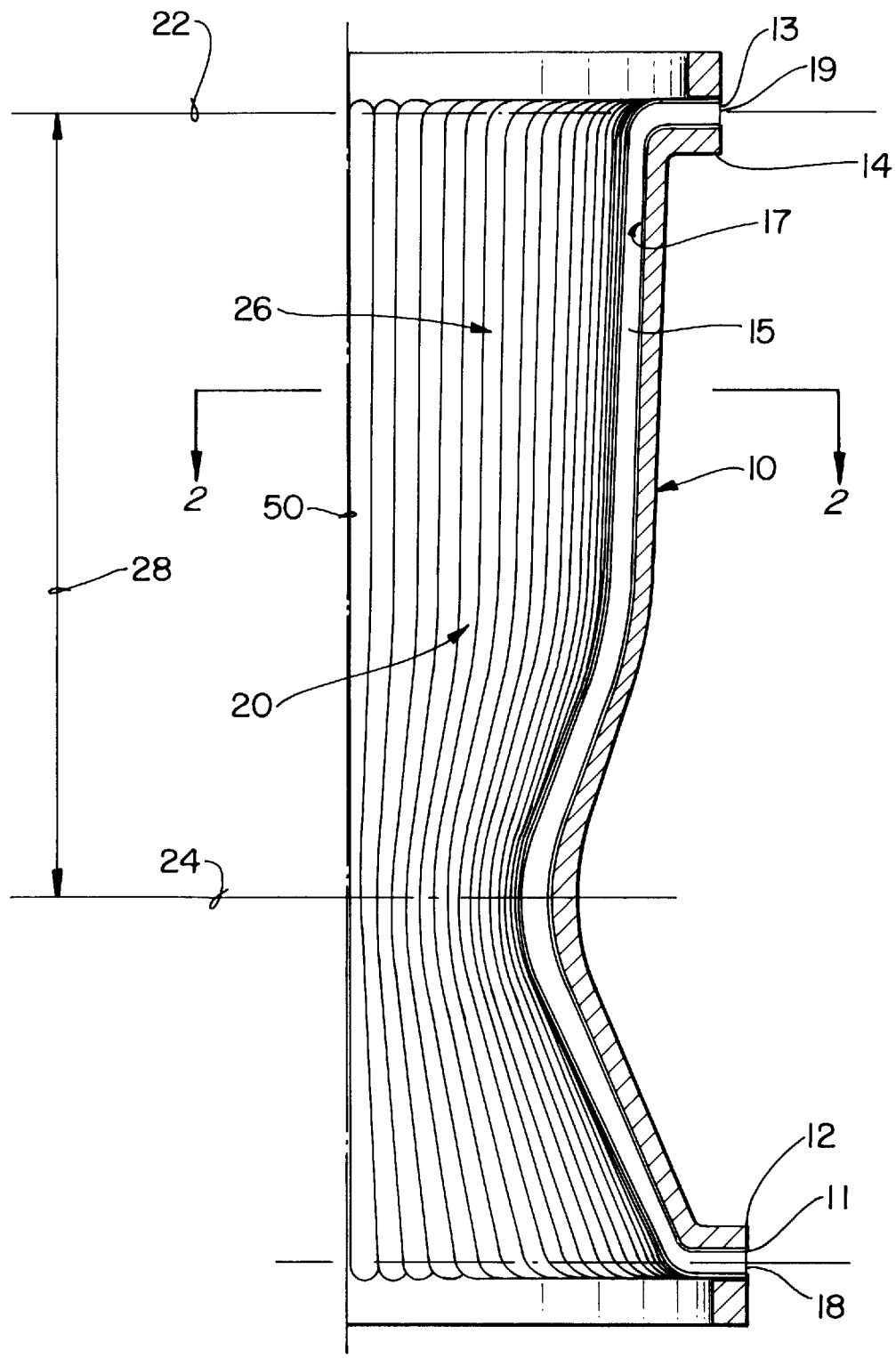
FIG. 1 is a cross-sectional view of the structural jacket of the rocket thrust chamber of the present invention.

A structural jacket 10 of a rocket thrust chamber for an expander cycle rocket engine is shown in FIG. 1 with a centerline axis 50 defined therethrough. The annular structural jacket 10 is concentric about the axis 50 and radially outward therefrom, and includes a plurality of inlet manifold holes 11 radially encompassing one end 12 of the jacket 10 and a plurality of manifold exit holes 13 radially encompassing the opposite end 14 of the structural jacket 10. Due to its structural nature, the jacket 10 is preferably made of a high tensile material such as stainless steel.

Figure 2:
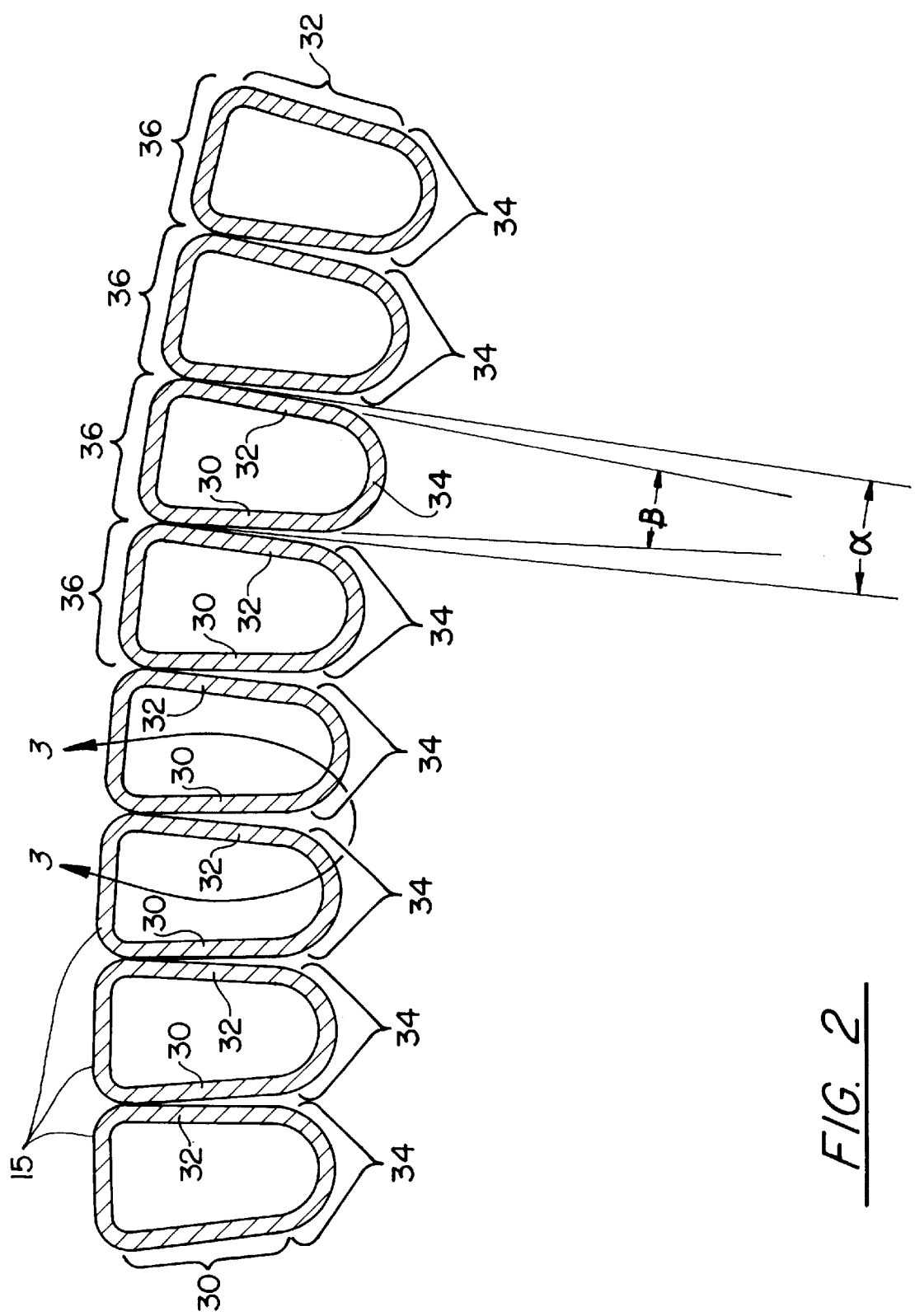
FIG. 2 is a cross-sectional view of the tubes of the present invention taken along line 2—2 of FIG. 1.

A predetermined quantity, N, of tubes 15 are located concentric about the axis 50 and radially inward of the jacket 10 relative to the axis 50. The tubes 15 are formed into a shape which conforms to the desired axial profile of the structural jacket 10, as shown in FIG. 2. The tubes 15 are preferably made of a high conductivity material such as copper or a copper alloy. Each tube 15 is located within the structural jacket 10 so that the tube 15 extends axially along the structural jacket 10. One end 18 of each tube 15 communicates with an inlet manifold (not shown) through one of the inlet holes 11 and the other end 19 is communicates with an exhaust manifold (not shown) through one of the outlet holes 13. The tubes 15 define a tube bundle 20 that has an inlet plane 22, a throat plane 24, and a convergent combustion chamber 26 therebetween. As shown in FIG. 1, the inlet plane 22 and the throat plane 24 are perpendicular to the axis 50, and each tube 15 has a convergent portion extending between the inlet plane 22 and the throat plane 24.

As shown in FIG. 2, each tube 15 spans a sector angle α equal to 360°/N. The convergent portion 28 of each tube 15 comprises a first sidewall 30 and a second sidewall 32, both of which are substantially planar. The first sidewall 30 is in spaced relation to the second sidewall 32 and diverges radially therefrom, thereby defining an angle of divergence β between the first sidewall 30 and the second sidewall 32. The convergent portion 28 of each tube 15 further includes a first endwall 34 and a second endwall 36, each of which are integral with the first and second sidewalls 30, 32. The first endwall 34 is substantially "U-shaped" in cross section, as shown in FIG. 2, and the first endwall 34 extends from the first sidewall 30 to the second sidewall 32 along the entire length of the tube 15. The second endwall 36, which is preferably substantially "U-shaped" in cross section, is spaced radially outward from the first endwall relative to the axis 50 and extends from the first sidewall 30 to the second sidewall 32. The angle of divergence β of each tube 15 is greater than the sector angle α, and the angle of divergence β is such that the particular braze material chosen for bonding the tubes 15 will not wick out to the first endwall 34 as discussed below.

Figure 3:
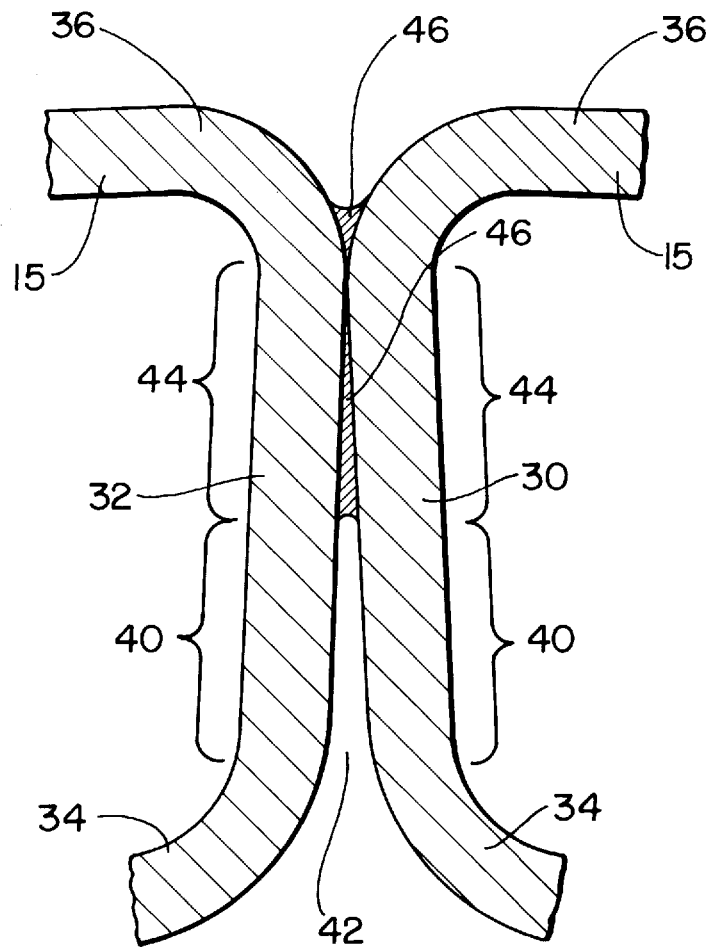
FIG. 3 is an enlarged section taken along line 3—3 of FIG. 2.

Referring to FIG. 3, each tube 15 is immediately adjacent to two other tubes 15 and since the angle of divergence β is greater than the sector angle α, the radially inward portion of each first sidewall 30 is in spaced relation to the opposing second sidewall 32 of the tube 15 immediately adjacent thereto. Thus, the radially inward portion 40 of each first sidewall 30 and the radially inward portion 40 of the second sidewall 32 immediately adjacent thereto define a channel 42. By contrast, the radially outward portion 44 of each first sidewall 30 is bonded to the radially outward portion 44 of the second sidewall 32 of the tube 15 immediately adjacent thereto, preferably with a braze material 46.

The tube bundle 20 may be fabricated by coating each tube 15 with a braze material 46, such as a copper alloy, having a melting temperature lower than the material of which the tubes 15 are made. Using a fixture, coated with a release agent suitable for the particular braze material 46, the tubes 15 can be positioned to form the tube bundle 20, and then subjected to braze temperatures. As the braze material melts, it flows, or "wicks" into the channels 42 between immediately adjacent tubes 15. However, since the radially inward portion 40 of each tube sidewall 30 diverges from the radially inward portion 40 of the sidewall 32 immediately opposite therefrom, the braze material 46 stops wicking well short of the first endwalls of the tubes 15. Thus when the tubes 15 and fixture are returned to ambient temperature, the result is a tube bundle 20 as described above. As those skilled in the art will readily appreciate, such a tube bundle 20 can be readily inspected to determine whether each of the tubes 15 is brazed along its entire length to each of the tubes 15 immediately adjacent thereto.

Following the brazing of the tube bundle 20, the structural jacket 10 is preferably formed thereabout by vapor plasma spray of stainless steel, or other suitable material, onto the radially outer surface of the tube bundle, such that each of the second endwalls 36 is bonded to the inner surface of the jacket 10. As those skilled in the art will readily appreciate, the vapor plasma spray process involves placing the tube bundle 20 in a vacuum chamber and spraying molten metal onto, and bonding to, the radially outward surface thereof to form a structural jacket 10. This process is preferred over other known processes of making a structural jacket because it effectively fills the cleavage between adjacent tubes 15 radially outward of the braze material, thereby eliminating the inspectability problem inherent in machined structural jackets, and is substantially faster than electroforming the jacket by the electroplating process. A tube bundle and jacket so formed results in a thrust chamber in which the structural jacket is bonded to the second endwall of each tube 15 along the entire length thereof, and each tube 15 is bonded to those tubes 15 immediately adjacent thereto along the entire length thereof.

During engine operation, firing of the engine heats the radially inward surface of the tube bundle 20, causing thermal expansion of the first endwall 34 of each tube 15. However, due to boundary layer effects and heat transfer to the fuel, the sidewalls 30, 32 experience only minimal thermal expansion. As those skilled in the art will readily appreciate, thermal expansion of the first endwalls 34 reduces the spacing between immediately adjacent first endwalls 34, but does not cause the first endwalls 34 to bow as significantly as occurred in the prior art, since the radially inward portions 40 of the sidewalls 30, 32 are free to flex to accommodate the expansion of the first endwalls 34. Consequently, upon shut-down of the engine and cooling of the thrust chamber, thermal contraction of the first endwalls 34 results in minimal thermal stress as compared to expander cycle thrust chambers of the prior art. Multiple firings produce similar thermal expansion and contraction excursions which produce significantly less stress and strain in the tubes 15 than the bowing and unbowing of the liners of thrust chambers of the prior art with flat inner walls exposed to the combustor flame.

The tubular configuration of the present invention provides enhanced heat transfer compared to smooth wall milled channel or platelet designs because of the increased surface area of tubes 15. The first endwalls provide up to 40 percent more surface area, or 15 percent more effective heat transfer area (after taking into account boundary layer effects) over smooth wall designs for an equivalent chamber length. The tubular construction also provides improved pressure drop characteristics over rectangular channel designs. The natural pressure vessel shape of the tubes 15 combined with the bonding of adjacent tubes 15 only at the radially outward portion of each sidewall of the tubes 15 provides a construction that can respond to thermal stresses at lower strain levels than the thrust chambers of the prior art, thereby providing an expander cycle rocket thrust chamber having higher chamber pressure than that of the prior art and capable of multiple firings during a mission are without failure due to thermally induced fatigue.

Although this invention has been shown and described with respect to detailed embodiments thereof, it will be understood by those skilled in the art that various changes in form and detail thereof may be made without departing from the spirit and scope of the claimed invention.

I claim:

1. A thrust chamber for an expander cycle rocket engine, comprising:

a structural jacket having an axial centerline defined therethrough, a predetermined quantity, N, of tubes concentric about said axis and radially inward of said jacket relative to said axis, said tubes defining a tube bundle that has an inlet plane, a throat plane and a convergent combustion chamber therebetween, said inlet and throat planes perpendicular to a reference axis, each tube having a convergent portion extending between said inlet plane and said throat plane and spanning a sector angle α measured from said centerline equal to 360°/N, said convergent portion comprising first and second substantially planar sidewalls, each sidewall having a radially inward portion, and a radially outward portion radially outward therefrom, said first sidewall in spaced relation to said second sidewall and diverging radially therefrom thereby defining an angle of divergence β between said first sidewall and said second sidewall, a first endwall substantially "U-shaped" in cross section and extending from said first sidewall to said second sidewall, and a second endwall spaced radially outward from said first endwall and extending from said first sidewall to said second sidewall, wherein the angle of divergence for each tube is greater than the sector angle.

2. The thrust chamber of claim 1 wherein each tube is made of a material containing copper.

3. The thrust chamber of claim 2 wherein each of said tubes is immediately adjacent to two of said tubes, and the radially outward portion of each first sidewall is bonded to the radially outward portion of the second sidewall immediately adjacent thereto.

4. The thrust chamber of claim 3 wherein the radially inward portion of each first sidewall and the radially inward portion of the second sidewall immediately adjacent thereto define a channel.

5. The thrust chamber of claim 4 further comprising an annular structural jacket concentric about said axis and radially outward therefrom.

6. The thrust chamber of claim 5 wherein said second endwall is substantially "U-shaped" in cross section.

7. The thrust chamber of claim 1 wherein each tube is immediately adjacent to two of said tubes, and the radially outward portion of each first sidewall is bonded to the radially outward portion of the second sidewall immediately adjacent thereto.

8. The thrust chamber of claim 7 wherein the radially inward portion of each first sidewall and the radially inward portion of the second sidewall immediately adjacent thereto define a channel.

9. The thrust chamber of claim 8 further comprising an annular structural jacket concentric about said axis and radially outward therefrom.

10. The thrust chamber of claim 9 wherein said second endwall is substantially "U-shaped" in cross section.

* * * * *